Figure 1:
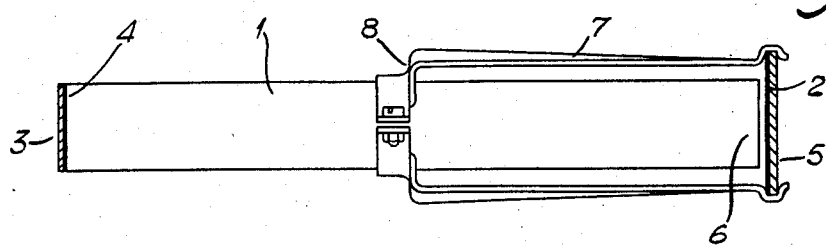

Oct. 13, 1964  R. DUNSMUIR  3,153,204

LASER ASSEMBLY

Filed Aug. 14, 1962

3,153,204
LASER ASSEMBLY
Robert Dunsmuir, Rugby, England, assignor to Associated Electrical Industries Limited, London, England, a British company
Filed Aug. 14, 1962, Ser. No. 216,774
Claims priority, application Great Britain, Aug. 21, 1961, 30,097/61
11 Claims. (Cl. 331—94.5)

The present invention relates to an optical maser sometimes termed a laser.

The optical maser or laser is concerned with the amplification of light radiation incident thereupon, by a phenomena in which the incident radiation, if of an appropriate wave-length, is capable of stimulating the laser to a further emission of radiation.

Such amplification occurs when the laser contains atoms at a high energy level which can be stimulated, by the incident radiation, to fall to a lower level and emit thereby as stimulated light, the energy lost by falling to the lower level. The stimulated beam of light emitted by a laser is characterised in that it is of small angular spread, high intensity and extremely narrow band width.

Since the wave-forms of both the stimulated and stimulating radiation are of the same mode, a beam of light of the appropriate wave-length, incident upon a laser containing atoms capable of being stimulated to a lower energy level will become amplified upon the addition thereto of the stimulated light.

It is well known that a cavity, in association with a means capable of amplifying radiation of an appropriate frequency or wave-length, can behave as an oscillator when the cavity, preferably provided with highly reflecting walls, is resonant with or is tuned to, the frequency of the radiation concerned, that is to say when the natural frequency of the cavity is that of the incident radiation. In such a cavity the oscillation produced is continuous and is maintained as long as oscillating radiation within the cavity gains energy from the amplifying means, at a rate sufficient to compensate for the radiation energy lost, both at the reflecting walls and absorbed in the medium therebetween.

A laser designed as an amplifying means, as hereinbefore described, may thus be made to oscillate in response to and therefore cause oscillation of, incident radiation of that appropriate wave-length capable of being amplified thereby, by being adapted to also act as a cavity resonant with the incident radiation. In one form of laser, designed particularly for amplification purposes, the cavity is formed by a pair of plane parallel reflecting surfaces provided thereupon, as would be constituted by the Fabry-Perot etalon used in optical interferometry practice, the surfaces being placed at a distance apart equal to $n\lambda/2$ where $n$ is an integer and $\lambda$ is the wavelength of the radiation concerned. In the resonant mode of such a cavity, the oscillating radiation therein is in the form of a plane fronted standing wave between the plane reflecting surfaces.

In order to maintain oscillation within the cavity the energy lost therein must be compensated by the energy from the laser, provided by the amplifying action thereof.

The output energy extracted from such a laser may be obtained by making one of the reflecting surfaces thereof partially translucent to the radiation, such that a selected fraction of the oscillating plane fronted wave therein may pass therethrough.

A laser of the kind in which the present invention is concerned, adapted to behave as an oscillator is constituted of a cylindrical and substantially mono-crystalline rod of ruby some 4 cms. in length and 5 mm. in diameter.

The ruby rod (crystalline aluminum oxide activated by chromium to produce the required atomic energy levels) has each of its ends polished to an optically plane surface perpendicular to the longitudinal axis of the rod, the polished ends being subsequently rendered highly reflecting, for example by the vacuum evaporation of a silver film thereonto, to provide a cavity therebetween as hereinbefore recited.

In an alternative embodiment, the ends of the rod may be accurately shaped and rendered reflecting to form parts of the surfaces of spheres of radii of curvature equal to the length of the crystal. Such lasers adapted to behave as a cavity may be stimulated to oscillation and emission of light at a wave-length capable also of being amplified thereby, for example at a wave-length of 6943 A. in the red region of the visible spectrum.

However, in a laser of this type, the ends of the crystal must necessarily be accurately machined, ground and lapped, in order that they may be optically flat and accurately parallel or symmetrical, depending on whether the end faces are planar or spherical to each other. However, it is often difficult to achieve the required accuracy in these respects, as ruby and certain other crystals suitable for use in lasers are difficult to machine.

In order to provide a laser assembly in which the necessity for accurate machining of the end faces of the laser crystal during its manufacture is reduced without deleteriously affecting the optical efficiency thereof, we have previously disclosed and described a laser assembly of the kind in which the laser crystal has two of its opposite end faces uniformly separated from similarly contoured reflecting surfaces at least one of the spaces separating a reflecting surface from its similar adjacent end face being filled with a light transmitting medium having refractive index substantially equal to that of the crystal.

However the effective optical length of the laser assembly, at a given wave-length, namely that located between the two reflecting faces thereof, will vary with temperature, due to both the expansion of the laser crystal, and the variation of reflective indices thereof, and of immersing medium. Such variation in the match between the reflective indices of the laser crystal and the surrounding medium, produces, in the laser assembly of the kind referred to, a variation in the optical length of the laser crystal with temperature, and causes variations in the optical efficiency and operating characteristics thereof; the object of the present invention is therefore to provide a laser assembly of the kind hereinbefore referred to, in which the optical efficiency and operating characteristics of the laser assembly may be maintained at an optimum value.

According to the present invention, in a laser assembly of the kind hereinbefore referred to, each reflecting face adjacent an end face of the laser crystal is so placed apart therefrom, that the variation of the separation therebetween, with temperature, is such as to optically compensate for the aggregate variation with temperature of the refractive indices of the laser crystal and the surrounding medium.

Either or both of the reflecting surfaces may be formed by a complete or partially silvered coating upon an optically ground surface or surfaces separate from the crystal; alternatively if only one such reflecting surface remote from the crystal is employed, a similar coating may be deposited upon the other end face of the crystal.

In optical masers wherein the crystal has a decreasing refractive index with temperature, the variations with temperature of refractive index, together with the thermal expansion thereof, will then tend to compensate for each other, full compensation in this respect being obtained when the temperature coefficient of refractive index is equal to the coefficient of thermal expansion.

In one embodiment of the present invention, the laser crystal is cylindrical in form, and a reflecting coating is deposited upon one of its end faces. The other reflecting surface may conveniently be provided upon an optically ground surface contoured similarly to, and uniformly separated from the crystal, the reflecting surface being supported by a frame clamped to the crystal at an adjacent end face of the selected position along its length such that the variation with temperature of the separation between the two reflecting surfaces located at opposite ends of the crystal affords optically compensation for the aggregate variations with temperature of the refractive indices of the crystal and its surrounding medium.

Figure 2:
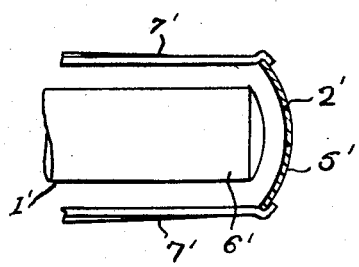

In order that the invention may be more readily understood it will now be described with reference to the accompanying drawing in which FIG. 1 is a diagrammatic view of one embodiment of the invention, and FIG. 2 is a diagrammatic view of a further embodiment of the invention.

Referring to the drawing, the crystal 1, preferably cylindrical in form and having optically flat end faces in space parallel relation to one another is located with its end faces between and adjacent the optically ground reflecting surfaces 2 and 3, and is together with the space between one of its end faces respectively the adjacent reflecting surfaces wholly or partially immersed in a surrounding medium (not shown in the figure) which has a known refractive index in relation to that of the crystal. The reflecting surfaces 2 is a highly reflecting metallic coating upon an optical flat 5, located adjacent the flat end face 6 of the crystal, and in spaced parallel relation thereto. The optical flat 5 is supported on a frame 7 secured to the crystal at a selected point along its length, such that the variation with temperature in the separation between the reflecting surfaces 2 and 3 located at opposite ends of the crystal optically compensates for variations occurring in the laser assembly resulting from variations with temperature of the refractive indices of the crystal and its surrounding medium (not shown).

For a simple treatment, assume that the support frame 7 for the optical flat 5 is maintained at a constant temperature irrespective of that of the laser crystal 1. Now, in general if the coefficient of expansion of the crystal is $\alpha$ and $l$ is its length at a temperature $t_1$, then its length at a temperature $t_2$ would be $l+\alpha l(t_2-t_1)$.

Furthermore, if the support frame 7 for the optical flat is clamped to the crystal at a point mid-way along its length and $l_1$ is taken as the distance between the reflecting surfaces 2 and 3 at a temperature $t_1$, then this distance at a temperature $t_2$ will be $l_2=l_1+l\frac{1}{2}\cdot\alpha l_1(t_2-t_1)$, since the support frame is maintained at a constant temperature.

Clearly by altering the position 8 at which the support frame is clamped to the crystal and hence the distance between the two reflecting surfaces 2 and 3, any desired amount of compensation for the variations in the refractive indices of the crystal and its surrounding medium with temperature can be obtained. Therefore as long as the coefficient of thermal expansion of the crystal is greater than its temperature coefficient of refractive index, compensation can be provided.

In practice of course, it may be difficult or impossible to hold the support frame 7 for the optical flat at a constant temperature, in which case its temperature and thermal expansion in relation to that of the crystal would have to be accounted for.

The gap between the end of the crystal 6 and the optical flat 5 contains the surrounding medium in which the crystal is immersed, it thus may be a small air gap, or alternatively, a wider gap filled with a liquid conveniently having the same refractive index as that of the crystal, the liquid being circulated for purposes of cooling the crystal. Moreover, in a further embodiment of the invention, optical flats carrying reflecting surfaces could be employed at both ends of the maser crystal.

In the case where a crystal (such as ruby) is used having a refractive index which increases with temperature, the width of the gap(s) between one or both end(s) of the crystal and the adjacent reflecting surface(s) and hence between the two reflecting surfaces themselves, can be designed in relation to the temperature coefficients of the refractive indices of the crystal and that of its surrounding medium (conveniently methylene iodide in the case of ruby) and in relation to the coefficient of thermal expansion of the crystal and of the support frame for the optical flats to provide the desired compensation therebetween at all temperatures. Moreover, variations in the width of the gap(s) between one or both crystal end face(s) and the adjacent reflecting surface(s) will in practice be a function not only of the relative coefficient of thermal expansion of the crystal and the support frames for the optical flats but also of their relative temperatures. Also to be accounted for is the fact that there is likely to be a temperature difference between the crystal and the surrounding medium in which it is immersed, particularly if the latter is circulated around the crystal for cooling purposes.

It is to be understood that the position of securement of the frame 8 to the laser crystal may be so chosen that compensation for the optical changes occurring in the laser assembly due to variation with temperature thereof may be achieved also, if the laser assembly according to the present invention, is used without a medium filling the space between a reflecting surface and the end face of the crystal adjacent thereto.

In the embodiment shown in FIG. 2, the crystal 1' is provided with end caps of convex spherical form having radii of curvature equal to the length of the crystal cylinder. Also, the optical member 5' is curved with the same radius as that given to end of the crystal rod, and, is provided with a metallized reflecting surface 2'.

What I claim is:

1. A laser assembly comprising a laser crystal, said laser crystal having symmetrically disposed end faces, a reflecting surface uniformly spaced apart from at least one of said end faces, said reflecting surface having a contour similar to that of said end face adjacent thereto, a light transmitting medium occupying at least one of said spaces between a reflecting surface and the end face of said crystal adjacent thereto, said medium having a refractive index substantially equal to that of said crystal, said space between said reflecting surface and said end face adjacent thereto being chosen such that a change in the length of said crystal produced by a variation in temperature thereof produces such a variation in said space as to optically compensate for the aggregate change in the refractive index of said crystal and said medium, also produced by said variation of temperature.

2. A laser assembly as claimed in claim 1 in which the said laser crystal is of cylindrical form.

3. A laser assembly as claimed in claim 2 in which the end faces of the laser crystal are flat, perpendicular to the longitudinal axis of the cylinder and in spaced parallel relation to one another.

4. A laser assembly as claimed in claim 2 in which the end faces of the laser crystal are in the form of convex spherical end caps having radii of curvature equal to the length of the cylinder.

5. A laser assembly comprising a laser crystal, said laser crystal being constituted of ruby, said ruby crystal having symmetrically disposed end faces, a reflecting surface uniformly spaced apart from at least one of said end faces, said reflecting surface having a contour similar to that of said end face adjacent thereto, a light transmitting medium occupying at least one of said spaces between a reflecting surface and the end face of said crystal adjacent thereto, said medium being methylene iodide having a substantially equal index of reflection as that of the ruby constituting said crystal, said space between said reflecting surface and said end face adjacent thereto being chosen such that a change in the length of said crystal produced by a variation in temperature thereof produces such a variation in said space as to optically compensate for the aggregate change in the refractive index of said ruby crystal and said methylene iodide also produced by said variation of temperature.

6. A laser assembly as claimed in claim 5, in which the end faces of the ruby crystal are flat, perpendicular to the longitudinal axis of the crystal, and in spaced parallel relation to one another.

7. A laser assembly as claimed in claim 5, in which the end faces and the ruby crystal are in the form of convex spherical end caps having radii of curvature equal to the length of the cylinder.

8. A laser assembly comprising a laser crystal, said laser crystal having symmetrically disposed end faces, a reflecting surface uniformly spaced apart from at least one of said end faces, clamping means secured to a selected portion of said crystal and supporting said reflecting surface in spaced apart relation from said end faces of said crystal adjacent thereto said reflecting surface having a contour similar to that of the said end faces adjacent thereto, a light transmitting medium occupying at least one of said spaces between a reflecting surface and the end face of said crystal adjacent thereto said medium having a refractive index substantially equal to that of said crystal, said space between said reflecting surface and said end faces adjacent thereto being chosen such that a change in the length of said crystal produced by variation in temperature thereof produces such a variation in said space as to optically compensate for the aggregate change in refractive index of said crystal and said medium, also produced by said variation of temperature.

9. A laser assembly as claimed in claim 8, in which the laser crystal is constituted of ruby and the light transmitting medium is methylene iodide.

10. A laser assembly as claimed in claim 8, in which the end faces of the crystal are flat, perpendicular to the longitudinal axis of the cylinder and in spaced parallel relation to one another.

11. A laser assembly as claimed in claim 8, in which the end faces of the laser crystal are in the form of convex spherical end caps having radii of curvature equal to the length of the cylinder.

No references cited.